(12) United States Patent
Liu

(10) Patent No.: US 7,517,492 B2
(45) Date of Patent: Apr. 14, 2009

(54) PROCESSES FOR SINTERING ALUMINUM AND ALUMINUM ALLOY COMPONENTS

(75) Inventor: Jianxin Liu, North Huntingdon, PA (US)

(73) Assignee: The Ex One Company, Irwin, PA (US)

( * ) Notice: Subject to any disclaimer, the term of this patent is extended or adjusted under 35 U.S.C. 154(b) by 414 days.

(21) Appl. No.: 10/580,932

(22) PCT Filed: Dec. 1, 2003

(86) PCT No.: PCT/US03/38469

§ 371 (c)(1),
(2), (4) Date: May 30, 2006

(87) PCT Pub. No.: WO2005/066380

PCT Pub. Date: Jul. 21, 2005

(65) Prior Publication Data

US 2007/0110608 A1    May 17, 2007

(51) Int. Cl.
    *B22F 3/10* (2006.01)
(52) U.S. Cl. ........................... 419/57; 419/60
(58) Field of Classification Search ........... 419/57, 419/60
    See application file for complete search history.

(56) References Cited

U.S. PATENT DOCUMENTS

| | | | |
|---|---|---|---|
| 3,063,836 A * | 11/1962 | Storcheim | 419/2 |
| 3,359,095 A * | 12/1967 | Foerster et al. | 419/47 |
| 3,366,479 A * | 1/1968 | Storchheim et al. | 419/36 |
| 5,460,775 A | 10/1995 | Hayashi et al. | |
| 5,525,292 A | 6/1996 | Nakao et al. | |
| 6,036,777 A | 3/2000 | Sachs | |
| 6,585,930 B2 | 7/2003 | Liu et al. | |
| 2003/0170137 A1 * | 9/2003 | Yeo et al. | 419/10 |

FOREIGN PATENT DOCUMENTS

| | | |
|---|---|---|
| JP | 06-033164 | 2/1994 |
| JP | 06-057363 | 3/1994 |

OTHER PUBLICATIONS

Myers et al., "Rapid Prototyping of Aluminum by Selective Laser Sintering," MPIF Proceedings, Apr. 8-10, 2002, San Antonio TX, pp. 233-241.
Corso et al., "Sintering Procedures for Aluminium P/M Parts and Metallographic Examination During the Process," Powder Metallurgy, 1976, No. 3, 171-176.

* cited by examiner

*Primary Examiner*—Roy King
*Assistant Examiner*—Ngoclan T Mai
(74) *Attorney, Agent, or Firm*—Thomas Lizzi, Esq.; IP & Internet Law North, LLC

(57) ABSTRACT

Methods for sintering aluminum powder comprise providing aluminum powder and heating the aluminum powder in a nitrogen atmosphere containing a partial pressure of water vapor in the range of about 0.001 kPa to about 0.020 kPa to sinter the aluminum powder to a transverse rupture strength of at least about 13.8 MPa. The aluminum powder is not pressed together by a mechanical force that substantially deforms particles of said aluminum powder either prior to or during the step of heating. Articles comprising sintered aluminum powder. The sintered aluminum powder has a transverse rupture strength of at least about 13.8 MPa. The microstructure of the sintered aluminum powder contains no compositional concentration gradients indicative of the use of a sintering aid and no evidence of particle deformation having occurred by an application of a mechanical force prior to or during the sintering of the aluminum powder.

19 Claims, 3 Drawing Sheets

PROCESSES FOR SINTERING ALUMINUM AND ALUMINUM ALLOY COMPONENTS

STATEMENT AS TO RIGHTS TO INVENTION MADE UNDER FEDERALLY-SPONSORED RESEARCH AND DEVELOPMENT

The U.S. Government has a paid-up license in this invention and the right in limited circumstances to require the patent owner to license others on reasonable terms as provided for by the terms of Contract No. N00014-03-M-0274 awarded by the Office of Naval Research.

BACKGROUND OF THE INVENTION

1. Field of the Invention

The present invention relates to the field of powder metallurgy. More particularly, the present invention relates to processes for sintering aluminum powder. The present invention also relates to sintered aluminum articles.

2. Description of the Related Art

Aluminum's light weight, good strength, and corrosion resistance make it a desirable material for many applications. Techniques now exist for making aluminum powder in sizes useful in powder metallurgical forming processes. Such aluminum powder may be essentially pure aluminum or an aluminum alloy. Powder metallurgical forming processes permit an article to be made to its final shape or near to its final shape with little or no machining, thus reducing overall processing costs and material waste.

Aluminum reacts very quickly and strongly with oxygen to form alumina ($Al_2O_3$), so quickly that an alumina film immediately forms whenever an aluminum surface is exposed to even small amounts of atmospheric oxygen or water vapor. The alumina film is very thin, its thickness typically being in the range of about 30 to about 90 nm. The alumina film is nearly impervious to the migration of both aluminum and oxygen. Once an alumina film is formed, it is very stable and resistant to chemical attack, because few elements react more readily with oxygen than aluminum does.

Thus, when aluminum powder is made, a thin, protective alumina film forms all over the surface of each aluminum powder particle. The alumina film presents a problem in making powder metallurgical parts from aluminum powder. In order to join individual aluminum powder particles together to form a useful article, it is necessary for the metal atoms in one powder particle to come into direct contact with the metal atoms of the adjacent particles to form metallurgical bonds between them and to permit the atoms to migrate between the particles and to rearrange themselves along the interparticle boundary. The alumina films on the powder surfaces, however, interfere with the interparticle atom migration.

Fortunately, persons working in the art of powder metallurgy have found several ways of overcoming the problem presented by the alumina film on aluminum powder particles. One way is to mechanically rupture the alumina films and press the underlying metal of adjacent powder particles together by plastically deforming the aluminum powder particles through the application of mechanical force. For example, aluminum powder can be metallurgically bonded together through mechanical deformation applied in a die press, hydrostatic press, a forge or an extrusion process.

Another way to deal with the alumina film problem is to mix the aluminum powder with a sintering aid prior to forming the powder into a shape, and then heat the shape to a temperature at which the sintering aid causes a liquid to form that attacks the alumina film. N. Myers et al., in "Rapid Prototyping of Aluminum by Selective Laser Sintering," Proceedings of 2002 International Conference on Metal Powder Deposition for Rapid Manufacturing, MPIF, Apr. 8-10, 2002, San Antonio, Tex., pp. 233-241, describes mixing magnesium powder into aluminum powder, solid free-form fabricating the mixture into a shape, and then heating the mixture to achieve a highly dense, metallurgically bonded article. Myers reports that the addition of powdered tin into the mixture of aluminum powder and magnesium powder facilitates the densification of the powder mixture. Other sintering aids are mentioned in U.S. Pat. No. 5,640,775, issued to Hayashi et al. on Oct. 24, 1995.

Some persons in the art also have made use of magnesium's high affinity for oxygen as a way of dealing with the alumina film on aluminum powder. Magnesium is one of the few elements that reacts more strongly with oxygen than does aluminum. Also, magnesium alloys favorably with aluminum.

The aforementioned patent to Hayashi et al. teaches using rapidly solidified aluminum powder containing 0.4 to 4.0% by weight of magnesium in combination with special processing to achieve a high density, useful article. It teaches that the aluminum powder is compacted together by the application of mechanical force. The compacted aluminum is sintered by generating nitrogen compounds on the aluminum powder surface through heating the compacted aluminum in an atmosphere having a partial pressure of nitrogen of at least 81 kPa, a partial pressure of a reducing gas that acts as nitrogen-combining acceleration gas component of at least 1 kPa, and partial pressure of water vapor of no more than 1 kPa. Hayashi et al. theorize that simultaneously effecting the reforming of the powder surface by addition of magnesium and the combining reaction with atmospheric nitrogen makes it possible to accelerate the sintering phenomena of the aluminum powder. Hayashi et al. warn that it is necessary to suppress the water vapor partial pressure to 1 kPa or less because water vapor impairs the effect of the magnesium and acts to decompose the nitrogen compound that forms on the powder surface.

U.S. Pat. No. 5,525,292, issued to Nakao et al. on Jun. 11, 1996, teaches the use of sublimed magnesium, i.e., magnesium that has evaporated from the solid state into a gas. Nakao et al. first presses aluminum powder together to form a compact. The compact is heated in a rare gas, such as argon, at a pressure of about one atmosphere (101 kPa). When the temperature reaches 500° C., the pressure is reduced to about 1 kPa or less for a few minutes causing the magnesium present to sublime. The magnesium may be present either as a solid piece of magnesium or magnesium powder mixed in with the aluminum powder in the compact. The magnesium can also be present as part of the aluminum alloy of the aluminum powder, so long as the alloy's magnesium content is at least 0.3% by weight. Nitrogen gas is then introduced to bring the pressure back to about one atmosphere (101 kPa) as the heating is continued to the sintering temperature, e.g., about 540° C., and held there while the compact densifies by sintering. Nakao et al. believe that the sublimated magnesium reacts to generate magnesium nitride ($Mg_3N_2$), which reacts with the aluminum oxide on the aluminum powder surfaces to expose metallic aluminum and thereby permits the compact to sinter.

Japanese Patent Laid-Open Publication Hei 06-033164 also teaches the use of aluminum powder that contains magnesium and heating in a nitrogen atmosphere. In this case, the magnesium is used to promote the formation of aluminum nitride (AlN) on the surface of the aluminum powder particles in the temperature range of 500° C. to 600° C. The powder is then compacted together by plastic deformation which breaks up and disperses the aluminum nitride coating within the aluminum shape that is produced.

Another way to deal with the alumina film problem is to forego metallurgically bonding the particles directly to one another and to use a separate binder, for example, an epoxy or a low melting metal or alloy, to bond the aluminum powder together into an aggregate.

The existing methods for circumventing the problem presented by the alumina film on aluminum powder are useful within their bounds. However, it would be advantageous to have a simpler process that does not require either deforming the aluminum powder, using a sintering aid, subliming magnesium at a low pressure, or making the final article as a cemented-together aggregate.

SUMMARY OF THE INVENTION

The present invention provides methods for sintering together aluminum powder that are simpler than those of the prior art. The present invention is based upon the inventor's surprising discovery that heating aluminum powder in a nitrogen ($N_2$) atmosphere which contains a partial pressure of water vapor ($H_2O$), in the narrow range of about 0.001 kPa to about 0.02 kPa, causes the aluminum powder to sinter together to a transverse rupture strength of at least about 13.8 MPa without using a sintering aid or pressing the aluminum powder together by mechanical force to rupture the alumina film prior to or during the heating of the powder. This discovery is particularly surprising because, at the time it was made, those skilled in the art believed that water vapor was to be avoided as much as possible when sintering aluminum, because aluminum reacts with oxygen and hydrogen. It was commonly believed that water vapor would act as a source of oxygen which aluminum would convert into an alumina film. Thus, those skilled in the art believed water vapor made the sintering of aluminum powder more, rather than less, difficult.

Without intending to be bound, the inventor theorizes that, in a nitrogen atmosphere, water vapor in the narrow partial pressure range of about 0.001 kPa to about 0.02 kPa acts to enhance the sintering of the aluminum powder by participating in a catalytic reaction involving the release of atomic hydrogen at oxygen vacancies on the alumina's surface, the hydrogen's diffusion into the alumina film, and the subsequent migration of alumina molecules away from the contact points of adjacent aluminum powder particles. This phenomenon results in a metal-to-metal contact of adjacent aluminum powder particles and allows sufficient mass transport of metal atoms across these contact points to initiate and sustain the sintering process that results in the densification and metallurgical bonding together of the aluminum powder particles.

In the methods of the present invention, aluminum powder is provided as a first step. The aluminum powder may be either a pure grade of aluminum or an aluminum alloy. The aluminum powder may be provided as loose powder or it may be formed into a shape by some process that leaves the aluminum powder particles substantially undeformed. For example, such processes for shaping the aluminum powder that are within the contemplation of the present invention include injection molding, powder containerization, and solid free-form techniques such as layered-manufacturing processes. The aluminum powder is heated in an atmosphere consisting primarily of nitrogen gas. The atmosphere also has a partial pressure of water vapor in the range of about 0.001 kPa to about 0.02 kPa. The aluminum powder is heated to a temperature and for a time sufficient for the aluminum powder to sinter together into a solid article which has a transverse rupture strength of at least about 13.8 MPa After sintering, the sintered powder article may be subjected to any desired subsequent processing, either before or after cooling to room temperature.

The sintering will be accompanied by some amount of densification, which may be anywhere from small to great. The amount of densification accompanying the sintering is controlled by selection of the sintering time and temperature.

In some applications, it is desirable to for the sintered article to have a low relative density, e.g., when the sintered article is to be used as a filter. "Relative density" as used herein means the ratio of the absolute density, i.e., the measured density, of porous article or pile of loose powder to the density which that article or powder pile would have if it contained no porosity. Relative density is expressed in terms of a percentage of the absolute density, whereas absolute density is expressed in units of mass per unit volume, e.g., grams per cubic centimeter. A highly porous article or powder pile has a low relative density while an article or sintered powder pile having no porosity has a relative density of 100%.

For most applications, high relative densities are preferred because they provide the sintered article with greater strength. Thus, it is generally preferred that the aluminum powder sinters to a relative density of at least about 60%.

Another aspect of the present invention relates to sintered articles produced by sintering aluminum powder in a nitrogen atmosphere which contains a partial pressure of water vapor, in the narrow range of about 0.001 kPa to about 0.02 kPa, to a transverse rupture strength of at least about 13.8 MPa, wherein the sintering is done without a sintering aid or pressing the aluminum powder together by mechanical force to rupture the alumina film prior to or during the heating of the powder. There is no other way known in the art for producing such sintered articles from aluminum powder where neither sintering aid nor pressing is employed.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DETAILED DESCRIPTION OF PREFERRED EMBODIMENTS

Figure 1:
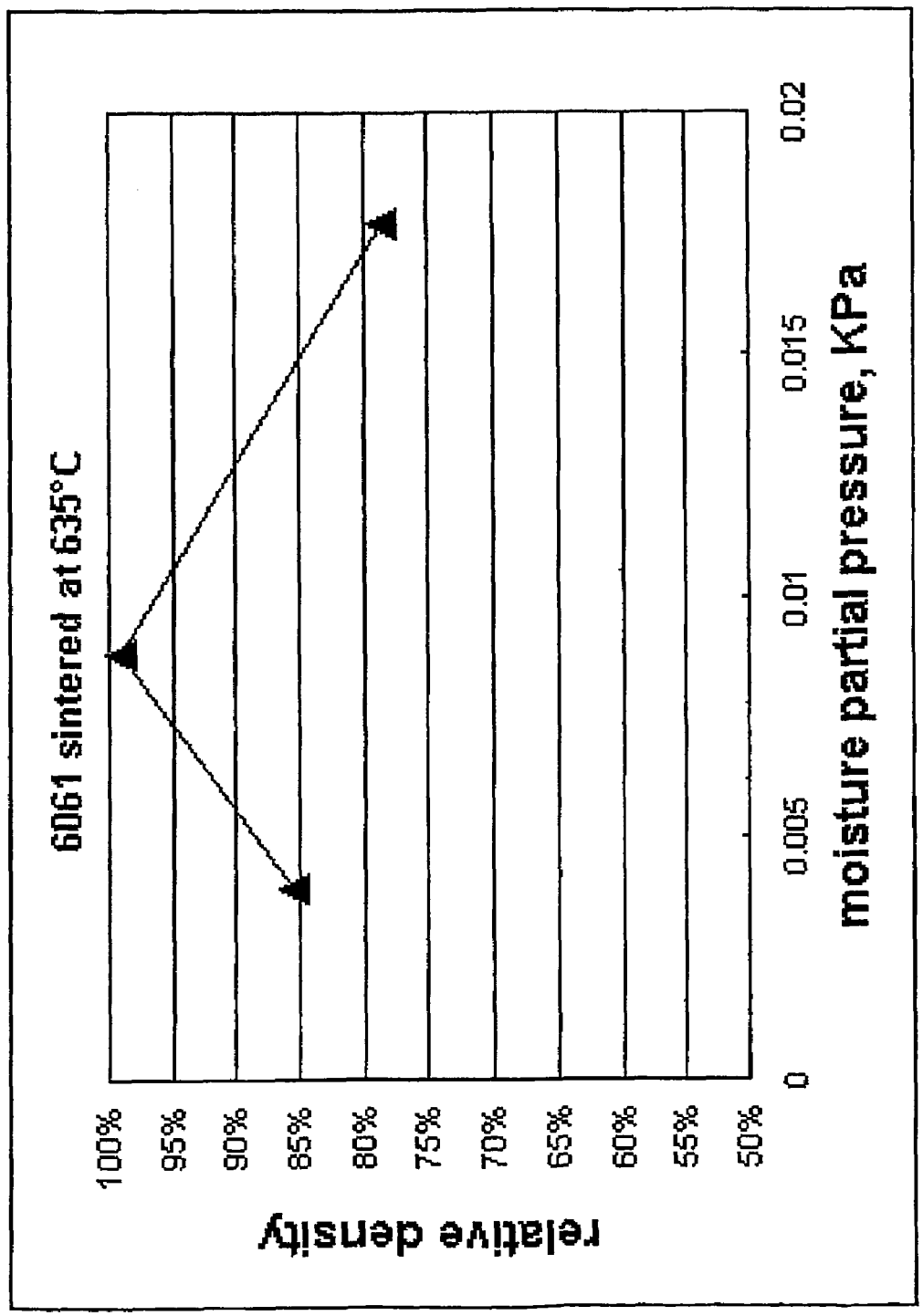
FIG. 1 is a graph of relative density as a function of the water vapor partial pressure in the nitrogen sintering atmosphere at a sintering temperature of 635° C. for alloy 6061 aluminum powder samples that were processed in accordance with the present invention.

In this section, some presently preferred embodiments of the present invention are described in detail sufficient for one skilled in the art to practice the present invention.

In these embodiments of the present invention, aluminum powder is provided and placed in a furnace. The atmosphere of the furnace is controlled to consist primarily of nitrogen gas having a partial pressure of water vapor in the range of about 0.001 kPa to about 0.02 kPa. The aluminum powder is heated at a controlled rate to a predetermined sintering temperature and held at that sintering temperature for a predetermined time to sinter together the aluminum powder to a transverse rupture strength of at least about 13.8 MPa. The actual transverse rupture strength level desirable will depend on the particular application for which the sintered article is intended to be used.

Some amount of shrinkage will occur during the sintering. The amount of shrinkage that is desirable will depend upon the aluminum powder parameters and the particular application for which the sintered article is intended to be used. In some cases, for example, where a very high relative initial relative density is employed or a very porous sintered article is desired, it may be desirable for the sintering to result in only a small amount of shrinkage. However, when a dense article is to be obtained, a higher amount of shrinkage during sintering will be desirable.

Similarly, the relative density of the sintered part desired will depend on the aluminum powder parameters and the application for which the sintered article is intended to be used. In some cases, for example where the sintered article will be used as a filter, a low relative density, e.g., about 40%, may be desirable. In other applications, higher relative densities are desirable as they provide for greater strength. In general, where article strength is a major consideration, a relative density of at least about 60% is preferred. More preferably, the aluminum powder is sintered to a relative density of at least about 75%, even more preferably to a relative density of at least about 85%, and most preferably to a relative density of at least about 95%.

In accordance with the present invention, the aluminum powder is not pressed together to substantially deform the particles of aluminum powder either prior to or during the step of heating. In other words, mechanical force is not used to rupture the alumina film on the aluminum powder particles.

The aluminum powders that are provided in accordance with the present invention are preferably spherical. This is because of the superior flowability of spherical powder. However, there is no limitation on powder shape. For example, for applications such as filter bodies, irregular-shaped powder particles are preferred because they provide for a lower initial packing density and result in a highly porous sintered article having a low relative density.

Similarly, there is no limitation on particle size, although it is preferable that the particle size be in the range of about 1 micron to about 500 microns. Very coarse powders are disfavored because they have very low ratios of number of contact points to powder particle volume. Very fine powders are disfavored because of their pyrophoricity and explosivity. It is therefore preferred that the particle size of the aluminum powder be in the range of about 45 microns to about 106 microns, i.e., −170/+325 mesh powder.

The aluminum powder may be pure aluminum or an aluminum alloy. The aluminum powder also may be a mixture of particles of pure aluminum and one or more aluminum alloys or may be a mixture of various aluminum alloys. There are no restrictions on the composition of the aluminum powder other than it is to contain sufficient aluminum in metallic form for the powder particles to form a substantially enveloping film of alumina.

The aluminum powder provided may have mixed with it one or more ceramic powders. Such powders include, without limitation, alumina, silica, silicon carbide, boron nitride, and refractory metal carbides, e.g., tungsten carbide. The amount and size of the ceramic powder is controlled so as to permit the desired amount of sintering of the aluminum powder to be achieved.

In some method embodiments of the present invention, the aluminum powder provided may have mixed with it a sintering aid, though the use of a sintering aid is not necessary for the operation of the present invention. Sintering aids include, but are not limited to, those whose compositions contain tin and/or magnesium.

The aluminum powder may be heated in the form of an uncontained, loose powder pile, but this is generally of little practical utility. Preferably, the aluminum powder is formed into a shape by some technique that does not involve substantial deformation of the aluminum powder particles. For example, the aluminum powder may be containerized, that is, placed in an inert container of a desired pre-sinter shape. The aluminum powder also may be formed by injection molding.

Preferably, the aluminum powder is formed by a layered manufacturing process. The term "layered manufacturing process" as used herein refers to any process which results in a useful, three-dimensional article that includes a step of sequentially forming the shape of the article one layer at a time. Layered manufacturing processes are also known in the art as "rapid prototyping processes" when the layer-by-layer building process is used to produce a small number of a particular article. Preferred layered manufacturing processes include the three-dimensional printing ("3DP") process and the Selective Laser Sintering ("SLS") process. An example of the 3DP process may be found in U.S. Pat. No. 6,036,777 to Sachs, issued Mar. 14, 2000. An example of the SLS process may be found in U.S. Pat. No. 5,076,869 to Bourell et al., issued Dec. 31, 1991.

Most preferably, the aluminum powder is formed using the 3DP process. The 3DP process is conceptually similar to ink-jet printing. However, instead of ink, the 3DP process deposits a binder onto the top layer of a bed of powder. This binder is printed onto the powder layer in a pattern according to a two-dimensional slice of a three-dimensional electronic representation of the article that is to be manufactured. One layer after another is printed until the entire article has been formed. The binder may comprise at least one of a polymer and a carbohydrate. Examples of suitable binders are given in U.S. Pat. No. 5,076,869 to Bourell et al., issued Dec. 31, 1991, and in U.S. Pat. No. 6,585,930 to Liu et al, issued Jul. 1, 2003.

The 3DP process printed article typically consists of from about 30 to over 60 volume percent powder, depending on powder packing density, and about 10 volume percent binder, with the remainder being void space. The printed article at this stage is somewhat fragile. Post-printing processing may be conducted to enhance the physical and/or mechanical properties of the printed article. Typically, such post-printing processing includes thermally processing the printed article to replace the binder with an infiltrant material that subsequently hardens or solidifies, thereby producing a highly dense article having the desired physical and mechanical properties. However, the present invention may eliminate the need for infiltration by using sintering to density and strengthen the printed article to the final desired levels. Or it may augment the infiltration by using sintering to partially densify the printed part into a cohesive body into which the infiltrant may then be introduced.

The three-dimensional electronic representation of the article that is used in the layered manufacturing process is typically created using Computer-Aided Design ("CAD") software. The CAD file of the three-dimensional electronic representation is typically converted into another file format known in the industry as stereolithographic or standard triangle language ("STL") file format or STL format. The STL format file is then processed by a suitable slicing program to produce an electronic file that converts the three-dimensional electronic representation of the article into an STL format file comprising the article represented as two-dimensional slices. The thickness of the slices is typically in the range of about 0.008 cm to about 0.03 cm, but may be substantially different from this range depending on the design criterion for the article that is being made and the particular layered manufacturing process being employed. Suitable programs for making these various electronic files are well-known to persons skilled in the art.

The step of heating the aluminum powder, in either the unformed or formed condition, may be done in any type of furnace that can maintain a controlled-composition atmosphere. The furnace must be capable of heating the aluminum powder to the desired sintering temperature. The sintering may be either solid state sintering, supersolidus liquid phase sintering, or, as when a sintering aid is used, liquid phase sintering. Typically, the sintering will be done in the temperature range of between about 550° C. and 650° C. The temperature to be used, which may be outside this range, will depend on the composition and the particle size distribution of the aluminum powder and the desired degree of sintering. The time the aluminum powder is exposed to the sintering temperature will also depend on the composition and the particle size distribution of the aluminum powder and the desired degree of sintering.

Where a binder has been used in forming the aluminum powder into a shape, the heating cycle is controlled to permit the binder to be removed.

After the aluminum powder is placed in the furnace, the atmosphere of the furnace is exchanged or purged to provide an atmosphere consisting primarily of nitrogen with a partial pressure of water vapor in the range of about 0.001 kPa to about 0.02 kPa. The use of a partial pressure of water vapor outside of this range results in poor or no sintering of the aluminum powder. More preferably, the partial pressure of water vapor is in the range of about 0.003 kPa to about 0.015 kPa. Persons skilled in the art will be able to determine, without undue experimentation, the optimum partial pressure of water vapor within these ranges for the particular aluminum powder composition and size distribution and sintering temperature employed. The atmosphere may contain minor amounts of other constituents, so long as they do not interfere with the sintering of the aluminum powder.

The present invention also includes as embodiments articles comprising aluminum powder that has been sintered to a transverse rupture strength of at least about 13.8 MPa without the use of a sintering aid or particle deformation by mechanical force applied prior to or during the sintering of the aluminum powder. Such sintered articles are produced by heating the aluminum powder in a nitrogen atmosphere which contains a partial pressure of water vapor, in the narrow range of about 0.001 kPa to about 0.02 kPa to sinter the aluminum powder. There is no other way known to produce such articles.

The use or non-use of a sintering aid may determined by examining the microstructure of the sintered article to detect whether or not it contains compositional concentration gradients indicative of the use of sintering aid. Whether or not the aluminum powder particles were deformed by mechanical force can be determined by examining the microstructure of the sintered article to determine the shape of the prior particle boundaries as outlined by the alumina that made up the films that enveloped the particles prior their sintering together. The prior particle boundary shapes will correspond to those of the undeformed aluminum powder where no mechanical force has been applied.

The aluminum powder comprising such articles may be either pure aluminum or an aluminum alloy. It also may be a mixture of particles of pure aluminum and one or more aluminum alloys or may be a mixture of various aluminum alloys. There are no restrictions on the composition of the aluminum powder other than it is to contain sufficient aluminum in metallic form for the powder particles to form a substantially enveloping film of alumina.

The articles that are embodiments of the present invention may also comprise one or more ceramics in their microstructures. Such ceramics include, without limitation, alumina, silica, silicon carbide, boron nitride, and refractory metal carbides, e.g., tungsten carbide. The amount and size of the ceramic powder is controlled so as to permit the desired amount of sintering of the aluminum powder to be achieved.

The desired relative density of such an article will depend upon the aluminum powder parameters and the application for which the article is intended to be used. In some cases, for example where the article will be used as a filter, a low relative density, e.g., about 40%, may be desirable. In other applications, higher relative densities are desirable as they provide for greater strength. In general, where article strength is a major consideration, a relative density of at least about 60% is preferred. More preferably, the relative density is at least about 75%, even more preferably it is at least about 85%, and most preferably it is at least about 95%.

EXAMPLE 1

Two samples of a commercially pure aluminum powder, grade UN No. 1396, were provided. The aluminum powder was spherical and had an average particle size in the range of 17 to 30 microns. Each sample was placed into a cylindrical alumina crucible, approximately 2.54 cm in diameter by 6.35 cm high and tapped lightly to settle the aluminum powder. Each sample was heated in a small box furnace capable of atmosphere control at a rate of 5° C./minute to the sintering temperature, held at the sintering temperature of 630° C. for 1 hour and then cooled to room temperature at approximately 5° C./minute. The atmosphere in the furnace was nitrogen containing a preselected partial pressure of water vapor.

One sample was processed in a nitrogen atmosphere in which the preselected water vapor partial pressure was essentially nil. No sintering was observed in this powder. In comparison, a sample that was processed with a preselected water vapor pressure of 0.014 kPa sintered to a relative density of 74.4%.

EXAMPLE 2

Three samples of commercially pure aluminum powder as in Example 1 were processed as in Example 1, except that the sintering temperature was 635° C. A first sample was processed in a nitrogen atmosphere having a preselected water vapor pressure of 0.004 kPa. This sample sintered to a relative density of 83.3%. A second sample was processed in a nitrogen atmosphere having a preselected water vapor pressure of 0.009 kPa. This sample sintered to a relative density of 80.8%. A third sample was processed in a nitrogen atmosphere having a preselected water vapor pressure of 0.018 kPa. This sample sintered to a relative density of 74.9%.

EXAMPLE 3

Two samples of commercially pure aluminum powder as in Example 1 were processed as in Example 1, except that the sintering temperature was 640° C. One sample was processed in a nitrogen atmosphere having a preselected water vapor partial pressure of 0.004 kPa. This sample sintered to a relative density of 75.3%. The other sample was processed in a nitrogen atmosphere having a preselected water vapor partial pressure of 0.017 kPa. No sintering was observed in this sample.

EXAMPLE 4

Two samples of aluminum powder of alloy UN No. 6061 were provided. The composition of the aluminum powder was, in weight percent: aluminum, balance; chromium, 0.07; copper, 0.25; iron, 0.25; magnesium, 0.89; manganese, 0.03; silicon, 0.65; titanium, 0.02; and vanadium, 0.01. The particle size distribution was, in weight percent: +140 mesh (>106 microns), 0.2; -140 mesh/+170 mesh (<106 microns/ >90 microns), 4.8; -170 mesh/+200 mesh (<90 microns/>75 microns), 9.2; -200 mesh/+325 mesh (<75 microns/ >45 microns), 77.6; and −325 mesh (<45 microns), 8.2.

The samples were processed as in Example 1, including the 630° C. sintering temperature and the preselected levels of water vapor partial pressures. The sample that was processed in a nitrogen atmosphere in which the preselected water vapor partial pressure was essentially nil showed no sintering of the aluminum powder. The sample that was processed in a nitrogen atmosphere in which the preselected water vapor pressure was 0.014 kPa sintered to a relative density of 64.3%.

EXAMPLE 5

Two samples of 6061 aluminum powder as in Example 4 were processed as in Example 2, including the sintering temperature of 635° C. and the preselected levels of water vapor partial pressures. A first sample was processed in a nitrogen atmosphere having a preselected water vapor pressure of 0.004 kPa. This sample sintered to a relative density of 85.4%. A second sample was processed in a nitrogen atmosphere having a preselected water vapor pressure of 0.009 kPa. This sample sintered to a relative density of 99.1%. A third sample was processed in a nitrogen atmosphere having a preselected water vapor pressure of 0.018 kPa. This sample sintered to a relative density of 78.6%.

Figure 2:
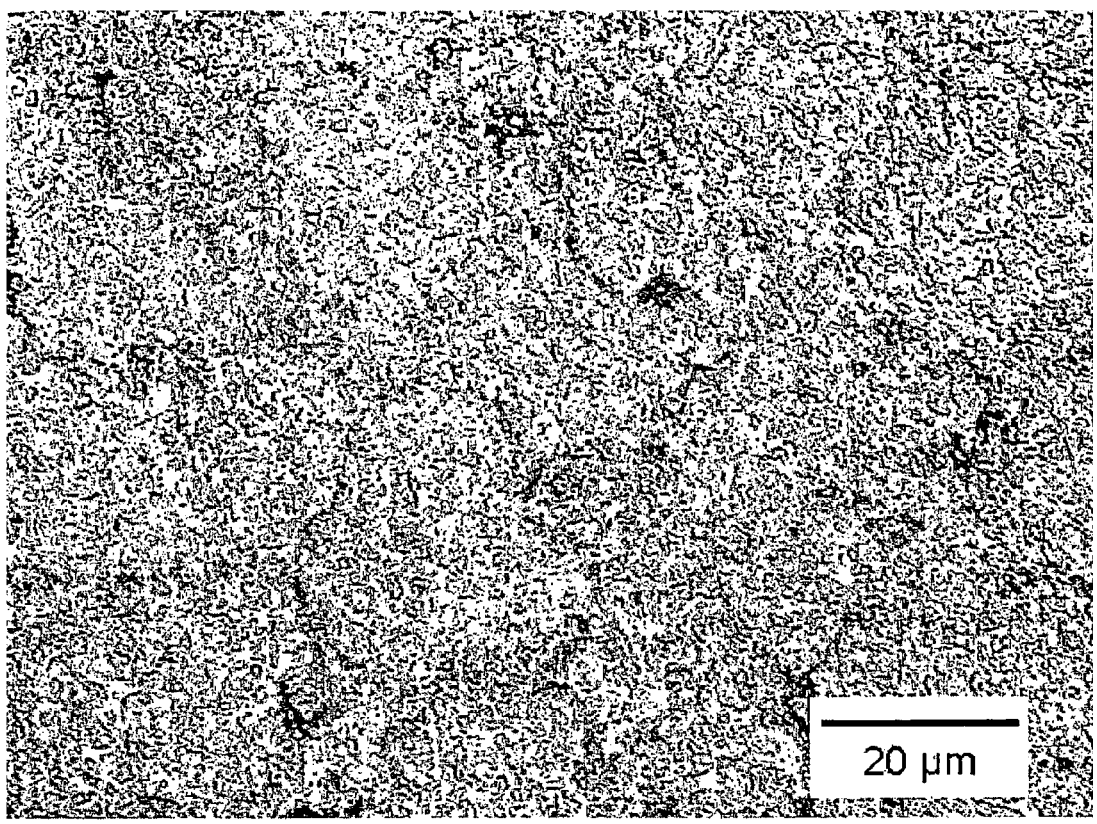
FIG. 2 is a photomicrograph of an alloy 6061 aluminum powder sample that was sintered to a relative density of 99.1% at 635° C. in an a nitrogen atmosphere having a partial pressure of water vapor of 0.009 kPa, in accordance with the present invention.

FIG. 1 shows a graph of sintered density as a function of the water vapor partial pressure in the nitrogen atmosphere for this experiment. FIG. 2 illustrates the dense microstructure of the sample that was processed in a nitrogen atmosphere having 0.009 kPa partial pressure of water vapor to achieve a relative density of 99.1%. The etchant used for the microstructure in FIG. 2 was, by volume, 10 parts nitric acid, 1 part hydrofluoric acid, and 89 parts water.

EXAMPLE 6

Two samples of 6061 aluminum powder as in Example 4 were processed as in Example 3, including the sintering temperature of 640° C. and the preselected levels of water vapor partial pressures. One sample was processed in a nitrogen atmosphere having a preselected water vapor partial pressure of 0.004 kPa. This sample sintered to a relative density of 84.2%. The other sample was processed in a nitrogen atmosphere having a preselected water vapor partial pressure of 0.017 kPa. No sintering was observed in this sample.

EXAMPLE 7

Five samples of 6061 aluminum powder as in Example 4 were processed as in Example 1, except the sintering temperatures were varied between 600° C. and 645° C. and the partial pressure of water vapor in the nitrogen atmosphere was kept constant at 0.004 kPa. No test was conducted at a sintering temperature of 630° C. The relative densities of the samples after sintering were:

| Sintering Temperature | Relative Density |
| --- | --- |
| 600° C. | 56.9% |
| 620° C. | 66.5% |
| 635° C. | 85.4% |
| 640° C. | 84.2% |
| 645° C. | 86.3% |

Figure 3:
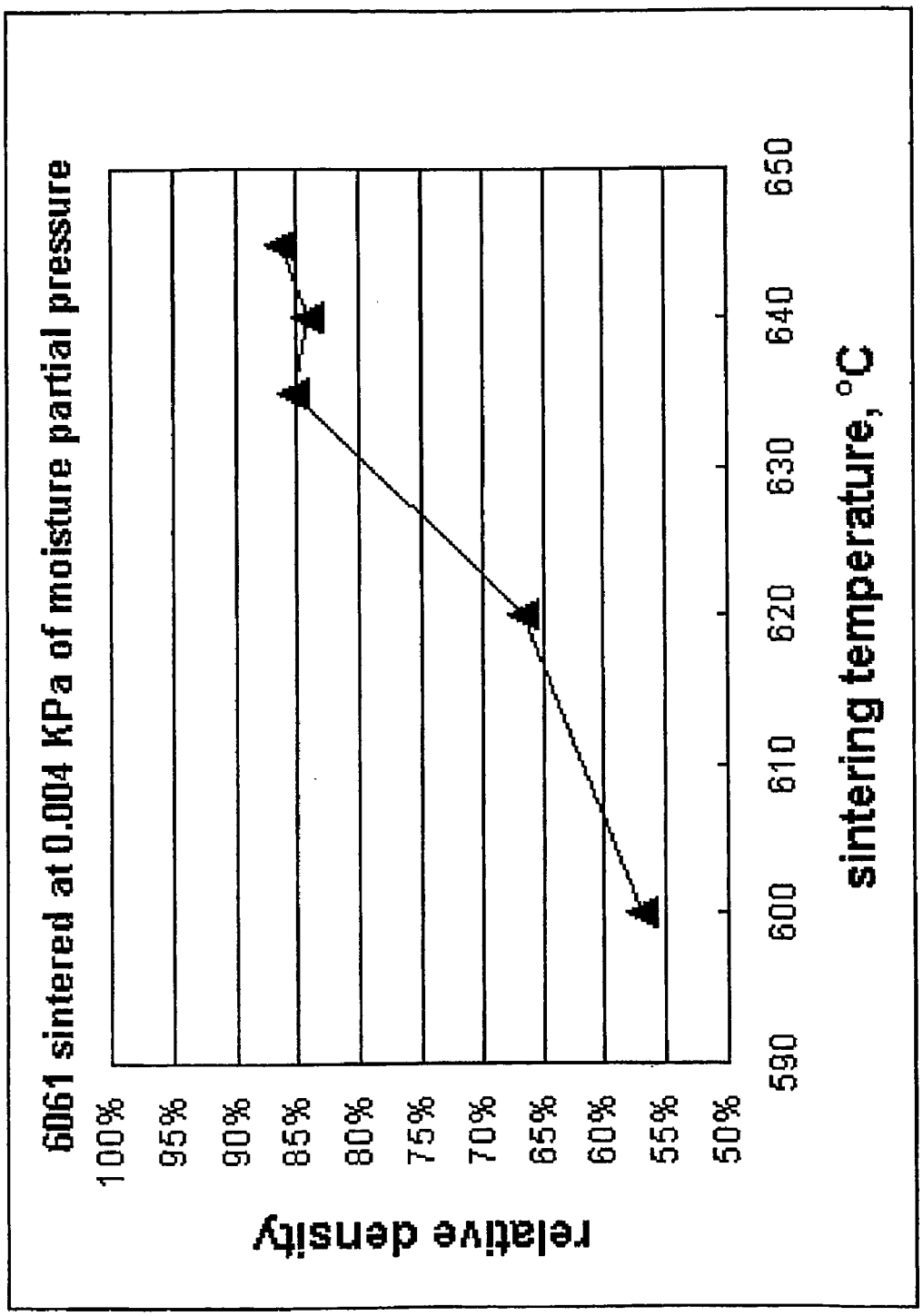
FIG. 3 is a graph of relative density as a function of sintering temperature for samples of alloy 6061 aluminum powder that were sintered in a nitrogen atmosphere having a partial pressure of water vapor of 0.004 kPa, in accordance with the present invention.

FIG. 3 shows the relative densities of these samples after sintering as a function of the sintering temperature.

The foregoing examples demonstrate that the present invention may be employed to sinter both pure aluminum powder and alloy aluminum powder. They also show that the present invention is operative over a range of particle sizes and highlight the criticality of the identified range of the partial pressure of the water vapor in the nitrogen sintering atmosphere.

While only a few embodiments of the present invention have been shown and described, it will be obvious to those skilled in the art that many changes and modifications may be made thereunto without departing from the spirit and scope of the invention as described in the following claims. All United States patents referenced in this specification are included herein by reference as if they were set forth in full herein.

What is claimed is:

1. A process for sintering aluminum powder comprising the steps of:
   a) providing an aluminum powder; and
   b) heating said aluminum powder, in an atmosphere consisting of nitrogen and a partial pressure of water vapor in the range of about 0.001 kPa to about 0.02 kPa, at a predetermined temperature and a predetermined time to sinter said aluminum powder to a transverse rupture strength of at least about 13.8 MPa and a relative density of at least about 60%,
   wherein said aluminum powder is not pressed together by a mechanical force prior to or during said step of heating.

2. The process of claim 1, wherein said aluminum powder has a composition consisting essentially of aluminum.

3. The process of claim 1, wherein said aluminum powder is an aluminum alloy.

4. The process of claim 1, further comprising the step of mixing said aluminum powder with ceramic powder.

5. The process of claim 4, wherein said ceramic powder includes at least one selected from the group consisting of alumina, silica, silicon carbide, boron nitride, and refractory carbides.

6. The process of claim 1, further comprising the step of mixing said aluminum powder with a sintering aid.

7. The process of claim 6, wherein the composition of said sintering aid includes at least one selected from the group consisting of magnesium and tin.

8. The process of claim 1, further comprising the step of forming said aluminum powder into a shape prior to said step of heating.

9. The process of claim 8, wherein said step of forming includes containerization of said aluminum powder.

10. The process of claim 8, wherein said step of forming includes metal injection molding of said aluminum powder.

11. The process of claim 8, wherein said step of forming includes forming said aluminum powder by a layered manufacturing technique.

12. The process of claim 11, wherein the layered manufacturing technique includes the three-dimensional printing (3DP) process.

13. The process of claim 11, wherein the layered manufacturing technique includes the selective laser sintering (SLS) process.

14. The process of claim 1, wherein said partial pressure of the water vapor is in the range of about 0.003 kPa to about 0.015 kPa.

15. The process of claim 1, wherein said aluminum powder consists of particles in the size range of between about 1 micron to about 500 microns.

16. The process of claim 15, wherein the size range of said aluminum powder particles is between about 45 microns and 106 microns.

17. The process of claim 1, wherein in the step of heating, said aluminum powder is sintered to a relative density of at least about 75%.

18. The process of claim 1, wherein in the step of heating, said aluminum powder is sintered to a relative density of at least about 85%.

19. The process of claim 1, wherein in the step of heating, said aluminum powder is sintered to a relative density of at least about 95%.

\* \* \* \* \*